(12) United States Patent
Anderson et al.

(10) Patent No.: US 12,126,011 B2
(45) Date of Patent: Oct. 22, 2024

(54) SURFACE MODIFICATION OF SILICON-CONTAINING ELECTRODES USING CARBON DIOXIDE

(71) Applicant: ENEVATE CORPORATION, Irvine, CA (US)

(72) Inventors: Heidi Anderson, Irvine, CA (US); Benjamin Yong Park, Irvine, CA (US); Frederic Bonhomme, Irvine, CA (US)

(73) Assignee: Enevate Corporation, Irvine, CA (US)

(*) Notice: Subject to any disclaimer, the term of this patent is extended or adjusted under 35 U.S.C. 154(b) by 30 days.

(21) Appl. No.: 17/943,628

(22) Filed: Sep. 13, 2022

(65) Prior Publication Data

US 2023/0006192 A1 Jan. 5, 2023

Related U.S. Application Data

(63) Continuation of application No. 17/393,145, filed on Aug. 3, 2021, now Pat. No. 11,450,845, which is a
(Continued)

(51) Int. Cl.
*H01M 4/1395* (2010.01)
*H01M 4/04* (2006.01)
(Continued)

(52) U.S. Cl.
CPC ....... *H01M 4/1395* (2013.01); *H01M 4/0421* (2013.01); *H01M 4/134* (2013.01);
(Continued)

(58) Field of Classification Search
CPC .. H01M 4/1395; H01M 4/0421; H01M 4/134; H01M 4/366; H01M 4/386; H01M 4/505; H01M 4/525; H01M 4/628; H01M 4/0492; H01M 4/1391; H01M 2300/0022; H01M 2300/0028; H01M 2300/0085;
(Continued)

(56) References Cited

U.S. PATENT DOCUMENTS 5,691,084 A * 11/1997 Kita .................. H01M 50/375
429/341
2006/0024588 A1 2/2006 Jito et al.
(Continued)

OTHER PUBLICATIONS

International Search Report, PCT/US2020/035958, dated Nov. 18, 2020.
(Continued)

*Primary Examiner* — Daniel S Gatewood
(74) *Attorney, Agent, or Firm* — McAndrews, Held & Malloy, Ltd.

(57) ABSTRACT

Various implementations of a method of forming an electrochemical cell include providing a first electrode, a second electrode, a separator between the first and second electrodes, and an electrolyte in a cell container. The first electrode can include silicon-dominant electrochemically active material. The silicon-dominant electrochemically active material can include greater than 50% silicon by weight. The method can also include exposing at least a part of the electrochemical cell to $CO_2$, and forming a solid electrolyte interphase (SEI) layer on the first electrode using the $CO_2$.

36 Claims, 9 Drawing Sheets

Related U.S. Application Data continuation of application No. 16/430,294, filed on Jun. 3, 2019, now Pat. No. 11,088,364.

(51) Int. Cl.
| | |
|---|---|
| *H01M 4/134* | (2010.01) |
| *H01M 4/36* | (2006.01) |
| *H01M 4/38* | (2006.01) |
| *H01M 4/505* | (2010.01) |
| *H01M 4/525* | (2010.01) |
| *H01M 4/62* | (2006.01) |

(52) U.S. Cl.
CPC ........... *H01M 4/366* (2013.01); *H01M 4/386* (2013.01); *H01M 4/505* (2013.01); *H01M 4/525* (2013.01); *H01M 4/628* (2013.01)

(58) Field of Classification Search
CPC ....... H01M 2300/0097; H01M 4/0447; H01M 10/049; H01M 10/0568; H01M 10/0569; H01M 10/0525; H01M 10/4207; H01M 10/02; H01M 50/46; Y02E 60/10
See application file for complete search history.

(56) References Cited

U.S. PATENT DOCUMENTS

| | | |
|---|---|---|
| 2011/0045360 A1 | 2/2011 | Deguchi |
| 2013/0069601 A1* | 3/2013 | Coowar ............ H01M 10/0567 320/162 |
| 2014/0154533 A1* | 6/2014 | Schaefer ........... H01M 10/4235 429/61 |
| 2015/0093653 A1 | 4/2015 | Coowar et al. |
| 2015/0125740 A1 | 5/2015 | Kawasaki et al. |
| 2017/0133670 A1 | 5/2017 | Park et al. |
| 2018/0108914 A1* | 4/2018 | Seong ................. H01M 50/461 |
| 2018/0159132 A1 | 6/2018 | Gonsor et al. |
| 2019/0051922 A1 | 2/2019 | Noda et al. |
| 2019/0131626 A1* | 5/2019 | Wang .................. H01M 4/1393 |

OTHER PUBLICATIONS

L.J. Krause, et al., The Effect of Carbon Dioxide on the Cycle Life and Electrolyte Stability of Li-Ion Full Cells Containing Silicon Alloy, Journal of the Electrochemical Society, 164 (12), 2017, pp. A2527-A2533.

International Preliminary Report on Patentability, PCT/US2020/035958, dated Dec. 16, 2021, 8 pages.

* cited by examiner

SURFACE MODIFICATION OF SILICON-CONTAINING ELECTRODES USING CARBON DIOXIDE

CROSS-REFERENCE TO RELATED APPLICATIONS

This application is a continuation of and claims the benefit of U.S. application Ser. No. 17/393,145 filed Aug. 3, 2021, (now allowed), which is a continuation of and claims the benefit of U.S. application Ser. No. 16/430,294 filed Jun. 3, 2019, now U.S. Pat. No. 11,088,364. The entirety of each of the above referenced applications are hereby incorporated by reference.

BACKGROUND

Field

The present application relates generally to silicon-containing battery electrodes. In particular, the present application relates to electrodes including silicon particles for use in battery electrodes.

Description of the Related Art

A lithium-ion (Li-ion) battery typically includes a separator and/or electrolyte between an anode and a cathode. In one class of batteries, the separator, cathode and anode materials are individually formed into sheets or films. Sheets of the cathode, separator and anode are subsequently stacked or rolled with the separator separating the cathode and anode (e.g., electrodes) to form the battery. Typical electrodes include electro-chemically active material layers on electrically conductive metals (e.g., aluminum and copper). Films can be rolled or cut into pieces which are then layered into stacks. The stacks are of alternating electro-chemically active materials with the separator between them.

When an anode is accepting lithium, the surface of the anode is in a reducing state. At this potential, carbonate electrolytes used in lithium ion batteries may react on the anode surface forming a solid electrolyte interface (SEI). The anode SEI composition may play an important role in maintaining the integrity of the anode surface and electrolyte when cycling lithium ion batteries. Silicon anodes expand and contract during cycling which can break the SEI layer and cause degradation of the electrolyte onto the newly exposed anode surface and can cause further impedance growth. There is a need to improve the SEI layer formed on a silicon anode to enable longer term cycle life.

SUMMARY

In certain implementations, a method of forming an electrochemical cell is provided. The method can include providing a first electrode, a second electrode, a separator between the first and second electrodes, and an electrolyte in a cell container. The first electrode can comprise silicon-dominant electrochemically active material. The silicon-dominant electrochemically active material can comprise greater than 50% silicon by weight. The method can also include exposing at least a part of the electrochemical cell to $CO_2$ and forming a solid electrolyte interphase (SEI) layer on the first electrode using the $CO_2$.

In some instances, the SEI layer can comprise solid carbonate on LiF particles. In some methods, forming the SEI layer can occur during lithiation.

In some instances, the silicon-dominant electrochemically active material can comprise the silicon at about 60% to about 100% by weight. In some instances, the silicon-dominant electrochemically active material can comprise the silicon at about 70% to about 100% by weight.

In some implementations, the second electrode can comprise nickel cobalt aluminum (NCA). In some such examples, the $CO_2$ can be produced from $Li_2CO_3$ on a surface of the NCA. In some implementations, the second electrode can comprise lithium cobalt oxide (LCO), lithium manganese oxide (LMO), or nickel manganese cobalt (NMC).

In some instances, the $CO_2$ can be provided in the cell container. For example, the $CO_2$ can be provided in an amount of about 0.01 to about 0.6 mg per mg of the silicon. As another example, the $CO_2$ can be provided in an amount of about 0.1 to about 0.6 mg per mg of the silicon. In some implementations, the $CO_2$ can be provided by adding dry ice to the electrolyte. In some implementations, the $CO_2$ can be dissolved in the electrolyte. As an example, the $CO_2$ can be dissolved in an amount of about 0.01 to about 0.6 mg per mg of the silicon. In some implementations, the $CO_2$ can be produced from a carbonate in the cell container.

In some implementations, the electrolyte can comprise greater than about 10% to about 90% carbonate solvent. In some instances, the electrolyte can comprise a cyclic carbonate solvent. For example, the solvent can comprise fluoroethylene carbonate (FEC), difluoroethylene carbonate (F2EC), trifluoroethylene carbonate (F3EC), ethylene carbonate (EC), propylene carbonate (PC), trifluoropropylene carbonate (TFPC), or a mixture thereof. In some instances, the electrolyte can comprise a linear carbonate solvent. For example, the solvent can comprise ethylmethyl carbonate (EMC), diethyl carbonate (DEC), dimethyl carbonate (DMC), methyl 2,2,2-trifluoroethyl carbonate (TFEMC), ethyl 2,2,2-trifluoroethyl carbonate (TFDEC), difluoromethyl fluoromethyl carbonate (TFDMC), or a mixture thereof.

In some implementations, the method can further comprise holding the first electrode, the second electrode, and the separator together while the at least a part of the electrochemical cell is exposed to $CO_2$. In some instances, the separator can comprise polyolefin, cellulose, or a combination thereof. The first electrode, the second electrode, and the separator can be held together with an adhesive. For example, the adhesive can comprise poly(vinylidene fluoride)/poly(methyl methacrylate) (PVDF/PMMA). The first electrode, the second electrode, and the separator can be held together by a gel electrolyte. The first electrode, the second electrode, and the separator can be held together mechanically. For example, the first electrode, the second electrode, and the separator can be held together with at least one clamp, bolt, clip, or combination thereof.

In some instances, the first electrode can be an anode and the second electrode can be a cathode. The first electrode can comprise a Si-composite electrochemically active film. The first electrode can be a self-supported film.

In certain implementations, an electrochemical device can be provided. The device can include a first electrode, a second electrode, a separator between the first electrode and the second electrode, and electrolyte in contact with the first electrode, the second electrode, and the separator. The first electrode can include silicon-dominant electrochemically active material. The silicon-dominant electrochemically active material can comprise greater than 50% silicon by weight. The first electrode can also include a solid electrolyte interphase (SEI) layer. The SEI layer can comprise solid carbonate on LiF particles.

In some instances, the electrochemically active material can comprise the silicon at about 60% to about 100% by weight. In some instances, the electrochemically active material can comprise the silicon at about 70% to about 100% by weight.

In some devices, the second electrode can comprise nickel cobalt aluminum (NCA). In some devices, the second electrode can comprise lithium cobalt oxide (LCO), lithium manganese oxide (LMO), or nickel manganese cobalt (NMC).

In some devices, the electrolyte can comprise greater than about 10% to about 90% carbonate solvent. The electrolyte can comprise a cyclic carbonate solvent. For example, the solvent can comprise fluoroethylene carbonate (FEC), difluoroethylene carbonate (F2EC), trifluoroethylene carbonate (F3EC), ethylene carbonate (EC), propylene carbonate (PC), trifluoropropylene carbonate (TFPC), or a mixture thereof. The electrolyte can comprise a linear carbonate solvent. For example, the solvent can comprise ethylmethyl carbonate (EMC), diethyl carbonate (DEC), dimethyl carbonate (DMC), methyl 2,2,2-trifluoroethyl carbonate (TFEMC), ethyl 2,2,2-trifluoroethyl carbonate (TFDEC), difluoromethyl fluoromethyl carbonate (TFDMC), or a mixture thereof.

In some devices, the separator can comprise polyolefin, cellulose, or a combination thereof. The first electrode, the second electrode, and the separator can be held together with an adhesive. For example, the adhesive can comprise poly (vinylidene fluoride)/poly(methyl methacrylate) (PVDF/PMMA). In some instances, the electrolyte can comprise a gel electrolyte.

In some devices, the first electrode can be an anode, and the second electrode can be a cathode. The first electrode can comprise a Si-composite electrochemically active film. In some instances, the first electrode can be a self-supported film. In some instances, the electrochemical device can be a battery.

DETAILED DESCRIPTION

Figure 1:
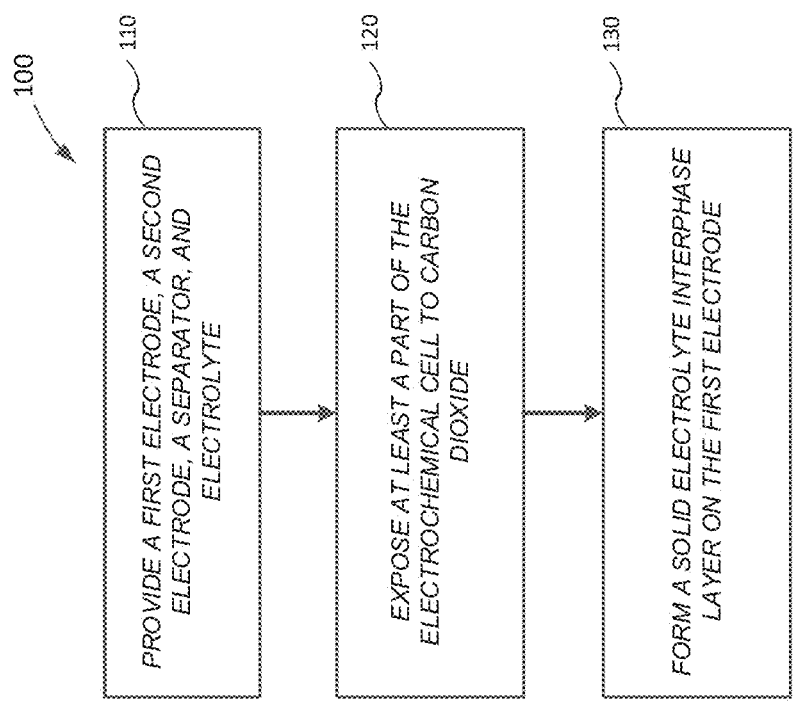
FIG. 1 depicts an example method of forming an electrochemical cell in accordance with certain embodiments described herein.

This application describes certain embodiments of electrodes (e.g., anodes and cathodes) comprising silicon material as electrochemically active material for use in electrochemical cells. Silicon can be a potentially high energy per unit volume host material, such as for lithium ion batteries. For example, silicon has a high theoretical capacity and can increase the energy density of lithium ion batteries compared with lithium ion batteries using other active materials such as graphite. However, silicon can swell in excess of 300% upon lithium insertion. Accordingly, batteries with silicon anodes may exhibit more rapid capacity loss upon cycling compared with batteries with graphite anodes. The repeat expansion and contraction of silicon particles during charge and discharge can lead to mechanical failure of the anode during cycling. Mechanical failure can expose new surfaces of silicon which can react with the electrolyte, irreversibly incorporating Li-ions in the solid electrolyte interface/interphase (SEI) and leading to capacity loss. Certain embodiments described herein can include silicon material with a modified surface, leading to improved cycling performance. For example, some embodiments can provide an SEI with increased stability (e.g., a substantially stable SEI and/or a stable SEI in some instances) to improve the capacity retention and reduce (e.g., and/or prevent in some instances) fast fading.

Some implementations described herein can create an SEI layer on a silicon-based electrode by introducing carbon dioxide ($CO_2$) during formation and cycling. Electrochemical cells with electrodes formed with such an SEI layer described herein may have advantages including increased cycle life, increased energy density, improved safety and cost, and/or decreased electrolyte consumption. Without being bound by theory (e.g., during lithiation in the presence of fluorine and $CO_2$), LiF particles can be formed and carbonate species may act as a capping agent on the surface of an electrode. The carbonates in current electrolyte systems do not efficiently form a protective layer on the LiF to control the LiF particle size. $CO_2$ can be more efficient at forming solid carbonates such that the LiF particles do not grow to a larger size. Smaller LiF particles in the SEI layer can allow for a more uniform distribution on the electrode surface, yielding a more lithium conductive SEI layer.

In some implementations, the electrodes treated with $CO_2$ can include silicon particles mixed with binder in a solvent and coated onto a current collector. For example, the Si particles may be used as the active material in powder form. The binder and current collector may be any of those known in the art or yet to be developed. For example, the current collector may be a copper or nickel foil. In some instances, conductive particles (e.g., carbon) may be added.

In some implementations, the electrodes treated with $CO_2$ can be film-based electrodes. For example, some composite material films can be monolithic, self-supporting structures using pyrolyzed polymer, e.g., as described in U.S. patent application Ser. No. 13/008,800 (U.S. Pat. No. 9,178,208), entitled "Composite Materials for Electrochemical Storage;" U.S. patent application Ser. No. 13/601,976, filed Aug. 31, 2012, and published on Jun. 19, 2014 as U.S. Patent Application Publication No. 2014/0170498, entitled "Silicon Particles for Battery Electrodes;" or U.S. patent application Ser. No. 13/799,405 (U.S. Pat. No. 9,553,303), entitled "Silicon Particles for Battery Electrodes," each of which is incorporated by reference herein. In some embodiments, the self-supported composite material film can be used as an electrode (e.g., without a current collector). In some instances, electrodes with silicon particles in carbonized polymer matrix (e.g., compared to electrodes with silicon particles suspended in a polymeric binder), can allow for a different surface for formation of the SEI layer as the surface of silicon would be initially covered in carbon. For example, in some electrodes with silicon particles in a carbonized polymer matrix, the carbon may cover substantially all of the silicon surface while most polymeric binders typically do not cover all of the active material surface.

Some composite material films may be provided on a current collector to form an electrode. In some embodiments, the composite material film can be attached to a current collector using an attachment substance. The attachment substance and current collector may be any of those known in the art or yet to be developed. For example, some composite material films can be provided on a current collector as described in U.S. patent application Ser. No. 13/333,864 (U.S. Pat. No. 9,397,338), entitled "Electrodes, Electrochemical Cells, and Methods of Forming Electrodes and Electrochemical Cells;" or U.S. patent application Ser. No. 13/796,922 (U.S. Pat. No. 9,583,757), entitled "Electrodes, Electrochemical Cells, and Methods of Forming Electrodes and Electrochemical Cells, each of which is incorporated by reference herein. Some composite material films may be formed on a current collector, e.g., as described in U.S. patent application Ser. No. 15/471,860, filed Mar. 28, 2017, and published on Oct. 4, 2018 as U.S. Patent Application Publication No. 2018/0287129, entitled "Methods of Forming Carbon-Silicon Composite Material on a Current Collector," which is incorporated by reference herein.

FIG. 1 shows an example method of forming an electrochemical cell. The method 100 can include providing a first electrode, a second electrode, a separator between the first and second electrodes, and an electrolyte in a cell container, as shown in block 110, and exposing at least a part of the electrochemical cell (e.g., the first electrode) to $CO_2$, as shown in block 120. The method 100 can also include forming a solid electrolyte interphase (SEI) layer on the first electrode (e.g., using the $CO_2$), as shown in block 130.

With respect to block 110, the first electrode can comprise a silicon-containing electrode. In certain embodiments, the silicon material can be at least partially crystalline, substantially crystalline, and/or fully crystalline. Furthermore, the silicon material may be substantially pure silicon or may be a silicon alloy. In one embodiment, the silicon alloy includes silicon as the primary constituent along with one or more other elements.

In some embodiments, the silicon material can comprise silicon powders/particles. For example, the particle size (e.g., diameter or a largest dimension of the silicon particles) can be less than about 50 µm, less than about 40 µm, less than about 30 µm, less than about 20 µm, less than about 10 µm, less than about 1 µm, between about 10 nm and about 50 µm, between about 10 nm and about 40 µm, between about 10 nm and about 30 µm, between about 10 nm and about 20 µm, between about 0.1 µm and about 50 µm, between about 0.1 µm and about 40 µm, between about 0.1 µm and about 30 µm, between about 0.1 µm and about 20 µm, between about 0.5 µm and about 50 µm, between about 0.5 µm and about 40 µm, between about 0.5 µm and about 30 µm, between about 0.5 µm and about 20 µm, between about 1 µm and about 50 µm, between about 1 µm and about 40 µm, between about 1 µm and about 30 µm, between about 1 µm and about 20 µm, between about 1 µm and about 15 µm, between about 1 µm and about 10 µm, between about 10 nm and about 10 µm, between about 10 nm and about 1 µm, less than about 500 nm, less than about 100 nm, about 100 nm, etc. All, substantially all, or at least some of the silicon particles may comprise the particle size (e.g., diameter or largest dimension) described above. For example, an average particle size (or the average diameter or the average largest dimension) or a median particle size (or the median diameter or the median largest dimension) of the silicon particles can be less than about 50 µm, less than about 40 µm, less than about 30 µm, less than about 20 µm, less than about 10 µm, less than about 1 µm, between about 10 nm and about 50 µm, between about 10 nm and about 40 µm, between about 10 nm and about 30 µm, between about 10 nm and about 20 µm, between about 0.1 µm and about 50 µm, between about 0.1 µm and about 40 µm, between about 0.1 µm and about 30 µm, between about 0.1 µm and about 20 µm, between about 0.5 µm and about 50 µm, between about 0.5 µm and about 40 µm, between about 0.5 µm and about 30 µm, between about 0.5 µm and about 20 µm, between about 1 µm and about 50 µm, between about 1 µm and about 40 µm, between about 1 µm and about 30 µm, between about 1 µm and about 20 µm, between about 1 µm and about 15 µm, between about 1 µm and about 10 µm, between about 10 nm and about 10 µm, between about 10 nm and about 1 µm, less than about 500 nm, less than about 100 nm, about 100 nm, etc. In some embodiments, the silicon particles may have a distribution of particle sizes. For example, at least about 95%, at least about 90%, at least about 85%, at least about 80%, at least about 70%, or at least about 60% of the particles may have the particle size described herein.

With continued reference to block 110, the first electrode can include from greater than 0% to about 100% by weight of silicon. For example, the amount of silicon by weight of the electrode (or the electrochemically active material) can include any weight percent within this range (e.g., about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 96%, about 97%, about 98%, about 99%, about 100%, etc.), or any range within this range such as any range formed by the example values (e.g., greater than about 0% to about 25% by weight, greater than about 0% to about 35% by weight, greater than about 0% to about 50% by weight, greater than about 0% to about 70% by weight, greater than about 0% to about 90% by weight, greater than about 0% to about 95% by weight, greater than about 0% to about 99% by weight, from about 10% to about 35% by weight, from about 10% to about 50% by weight, from about 10% to about 90% by weight, from about 10% to about 95% by weight, from about 10% to about 99% by weight, from about 10% to about 100% by weight, from about 30% to about 85% by weight, from about 30% to about 90% by weight, from about 30% to about 95% by weight, from about 30% to about 99% by weight, from about 30% to about 100% by weight, from about 50% to about 85% by weight, from about 50% to about 90% by weight, from about 50% to about 95% by weight, from about 50% to about 99% by weight, from about 50% to about 100% by weight, from about 60% to about 85% by weight, from about 60% to about 90% by weight, from about 60% to about 95% by weight, from about 60% to about 99% by weight, from about 60% to about 100% by weight, from about 70% to about 85% by weight, from about 70% to about 90% by weight, from about 70% to about 95% by weight, from about 70% to about 99% by weight, from about 70% to about 100% by weight, from about 80% to about 90% by weight, from about 80% to about 95% by weight, from about 80% to about 99% by weight, from about 80% to about 100% by weight, etc.).

In some instances, the first electrode can include a silicon-dominant electrode. For example, the first electrode can include silicon-dominant electrochemically active material.

As an example, the electrochemically active material can include at least about 50% to about 95% by weight of silicon, at least about 50% to about 97% by weight of silicon, at least about 50% to about 99% by weight of silicon, at least about 50% to about 100% by weight of silicon, at least about 60% to about 95% by weight of silicon, at least about 60% to about 97% by weight of silicon, at least about 60% to about 99% by weight of silicon, at least about 60% to about 100% by weight of silicon, at least about 70% to about 95% by weight of silicon, at least about 70% to about 97% by weight of silicon, at least about 70% to about 99% by weight of silicon, at least about 70% to about 100% by weight of silicon, at least about 80% to about 95% by weight of silicon, at least about 80% to about 97% by weight of silicon, at least about 80% to about 99% by weight of silicon, at least about 80% to about 100% by weight of silicon, at least about 90% to about 95% by weight of silicon, at least about 90% to about 97% by weight of silicon, at least about 90% to about 99% by weight of silicon, at least about 90% to about 100% by weight of silicon, at least about 95% to about 99% by weight of silicon, at least about 95% to about 97% by weight of silicon, at least about 95% to about 100% by weight of silicon, etc. In some examples, the electrochemically active material can include 100% silicon.

As described herein, the first electrode can include the silicon powders coated on a current collector. For example, the silicon powders can be coated on a current collector with a binder. For instance, the powders can be added to a slurry and coated on a current collector. Additional conductive particles (e.g., graphite) can also be added to the slurry.

In some embodiments, the first electrode can be a film-based electrode. For example, the electrode material can be formed into silicon-carbon composite films fabricated through using the silicon material and carbonized polymer (e.g., a hard carbon). In various embodiments, the film-based electrodes may be self-supported structures or attached to a current collector. When attached to a current collector, an attachment substance can be applied using a solution (e.g., a wet process) or applied as in a substantially solid state (e.g., a substantially dry process). In some embodiments, the electrode can comprise graphite. In some embodiments, the electrode can comprise glass carbon (e.g., a hard carbon prepared from carbonization of a polymer). The current collector can be any known in the art or yet to be developed. In some instances, the current collector can comprise a Cu or Ni foil.

In some instances, the first electrode can be an anode and the second electrode can be a cathode. The second electrode can include nickel cobalt aluminum (NCA), lithium cobalt oxide (LCO), lithium manganese oxide (LMO), or nickel manganese cobalt (NCM). However, the second electrode is not particularly limited. For example, the second electrode can be any cathode known in the art or yet to be developed. In some embodiments, the separator can include polyolefin, cellulose, or a combination thereof. However, the separator is not particularly limited. For example, the separator can be any of those known in the art or yet to be developed. The electrolyte can include a carbonate solvent, such as a cyclic carbonate solvent or a linear carbonate solvent. However, the electrolyte is not particularly limited. For example, the electrolyte can be any of those known in the art or yet to be developed. The cell container can include a housing, casing, a pouch, etc. However, the cell container is not particularly limited. For example, the cell container can be any of those known in the art or yet to be developed.

With respect to block 120, the method can comprise exposing at least a part of the electrochemical cell (e.g., the first electrode) to $CO_2$. The $CO_2$ can be provided to at least a portion of the electrochemical cell or can be produced by at least a portion of the electrochemical cell. In some instances, the $CO_2$ can be provided in the cell container. For example, about 0.01 mg to about 0.6 mg (e.g., about 0.03 mg to about 0.6 mg, about 0.05 mg to about 0.6 mg, about 0.1 mg to about 0.6 mg, about 0.15 mg to about 0.6 mg, about 0.2 mg to about 0.6 mg, about 0.25 mg to about 0.6 mg, about 0.3 mg to about 0.6 mg, about 0.35 mg to about 0.6 mg, about 0.4 mg to about 0.6 mg, about 0.45 mg to about 0.6 mg, about 0.5 mg to about 0.6 mg, etc.) of $CO_2$ per mg of silicon can be provided in the cell container. In some instances, the $CO_2$ can be added from a $CO_2$ gas source or from dry ice. The $CO_2$ can be provided in the cell container during the electrolyte injection step. The $CO_2$ source can be added to the cell stack or to the electrolyte. In some instances, the $CO_2$ can be dissolved (e.g., directly dissolved) in the electrolyte. For example, about 0.01 mg to about 0.6 mg of $CO_2$ per mg of silicon can be dissolved in the electrolyte. As one example, dry $CO_2$ gas (e.g., 0.01 mg, 0.015 mg, or 0.02 mg $CO_2$ per mg of silicon at room temperature and 1 atm) can be bubbled through the electrolyte solution.

Additionally or alternatively, the $CO_2$ can be produced from a carbonate or other additive in the cell container. In some implementations, the $CO_2$ can be produced by the second electrode. For instance, the second electrode can comprise NCA and the $CO_2$ can be produced by $Li_2CO_3$ (e.g., impurity) on the surface of the NCA. For example, $CO_2$ can be produced by the reaction $2HF+Li_2CO_3=2LiF+H_2O+CO_2$. In some implementations, the $CO_2$ can be produced by the electrolyte. For instance, the electrolyte can have greater than about 10% to about 90% (e.g., about 20% to about 90%, about 30% to about 90%, about 40% to about 90%, about 50% to about 90%, about 60% to about 90%, about 70% to about 90%, about 80% to about 90%) carbonate solvent. In some examples, the carbonate solvent can comprise a cyclic carbonate solvent such as fluoroethylene carbonate (FEC), difluoroethylene carbonate (F2EC), trifluoroethylene carbonate (F3EC), ethylene carbonate (EC), propylene carbonate (PC), trifluoropropylene carbonate (TFPC), or a mixture thereof. In some examples, the carbonate solvent can comprise a linear carbonate solvent, such as ethylmethyl carbonate (EMC), diethyl carbonate (DEC), dimethyl carbonate (DMC), methyl 2,2,2-trifluoroethyl carbonate (TFEMC), ethyl 2,2,2-trifluoroethyl carbonate (TF-DEC), difluoromethyl fluoromethyl carbonate (TFDMC), or a mixture thereof.

With reference to block 130, exposure to $CO_2$ can form an SEI layer on the first electrode, such as during lithiation (e.g., during formation and/or cycling). In some implementations, the SEI layer can include solid carbonate on LiF particles. Lithium salts may produce carbonate (or oxalate) capping agents. As described herein, the solid carbonate can provide a cap on the LiF particles to limit its growth during formation, allowing smaller particles to form a more uniform distribution in the SEI layer on the electrode surface. In various implementations, the SEI layer on the electrode can be about 1 nm to about 20 nm thick (e.g., about 1 nm to about 15 nm, about 1 nm to about 10 nm, about 3 nm to about 20 nm, about 3 nm to about 15 nm, about 3 nm to about 10 nm, about 4 nm to about 20 nm, about 4 nm to about 15 nm, about 4 nm to about 10 nm, about 5 nm to about 20 nm, about 5 nm to about 15 nm, about 5 nm to about 10 nm, etc.).

In some instances, the method 100 can further include holding the first electrode, the second electrode, and the separator together while at least a portion of the electrochemical cell is exposed to $CO_2$. Without being bound by theory, the first electrode, the second electrode, and the separator can be kept together during formation and cycling as generated or added gas may degrade the cell otherwise. Holding the cell layers together can reduce and/or prevent $CO_2$ gas from impeding interlayer contact, which can reduce and/or prevent degradation due to delamination. As an example, the first electrode, the second electrode, and the separator can be held together with a gel electrolyte, such as electrolyte with poly(vinylidene fluoride) (PVDF), poly(ethylene oxide) (PEO), poly(methyl methacrylate) (PMMA), polyacrylonitrile (PAN), polyethylene glycol (PEG), etc. As another example, the first electrode, the second electrode, and the separator can be held together with an adhesive layer on one or more of the electrodes and/or separator and on one or more sides. For example, the adhesive can comprise poly(vinylidene fluoride)/poly(methyl methacrylate) (PVDF/PMMA). In some implementations, the separator can include polyolefin, cellulose, or a combination thereof, and the separator can be coated with the adhesive. After the first electrode, the second electrode, and the separator are held together, they (or the entire battery) can be pressed. In some instances, they can be pressed with heat.

In some implementations, the first electrode, the second electrode, and the separator can be held together mechanically. The first electrode, the second electrode, and the separator can be held together with pressure. In some instances, the first electrode, the second electrode, and the separator can be held together with a clamp, bolt, clip, or combination thereof. For example, the first electrode, the second electrode, and the separator can be clamped between plates. The plates can be held together with one or more bolts or clips. Other examples are possible. After formation, the clamp, bolt, clip, or combination thereof can be removed or can remain (or be replaced with a different mechanical device) for use during operation.

Various implementations of an electrochemical device can comprise a first electrode, a second electrode, and a separator between the first and second electrodes. The electrochemical device can also include an electrolyte in contact with the first electrode, the second electrode, and the separator. The first electrode can include silicon-comprising electrochemically active material. In some instances, the first electrode can include silicon-dominant electrochemically active material comprising greater than 50% (e.g., about 60% to about 100%, about 70% to about 100%, about 80% to about 100%, about 90% to about 100%, about 95% to about 100%, etc.) silicon by weight. The first electrode can also include an SEI layer comprising solid carbonate on LiF particles. The first electrode can comprise a silicon-composite electrochemically active film. In some instances, the first electrode is a self-supported film. The electrochemical device can be a battery, e.g., a Li-ion battery.

EXAMPLES

Example 1

Cells were built with NCM cathodes and silicon-containing anodes. Cells were filled with either 1.2M $LiPF_6$ in EC/EMC (3/7 wt %) or 1.2M $LiPF_6$ in FEC/PC/EMC (2/1/7 wt %). The cells were hot/cold pressed to activate the polymer adhesive on the separator in order to maintain adhesion between the anode, cathode, and separator layers, even when the cell expanded from adding $CO_2$. $CO_2$ was added in the form of dry ice, directly to the cell stack. Cells were left overnight and tested the next day.

The Si-dominant anodes contained about 80 wt % Si, 5 wt % graphite and 15 wt % glassy carbon (which could be derived from resin) and were laminated on 15 μm Cu foil. The average loading was about 3.8 mg/cm$^2$. The cathodes contained about 92 wt % NCM-622, 4 wt % Super P and 4 wt % PVDF, and were coated on 15 μm Al foil. The average loading was about 23 mg/cm$^2$.

Figure 2A:
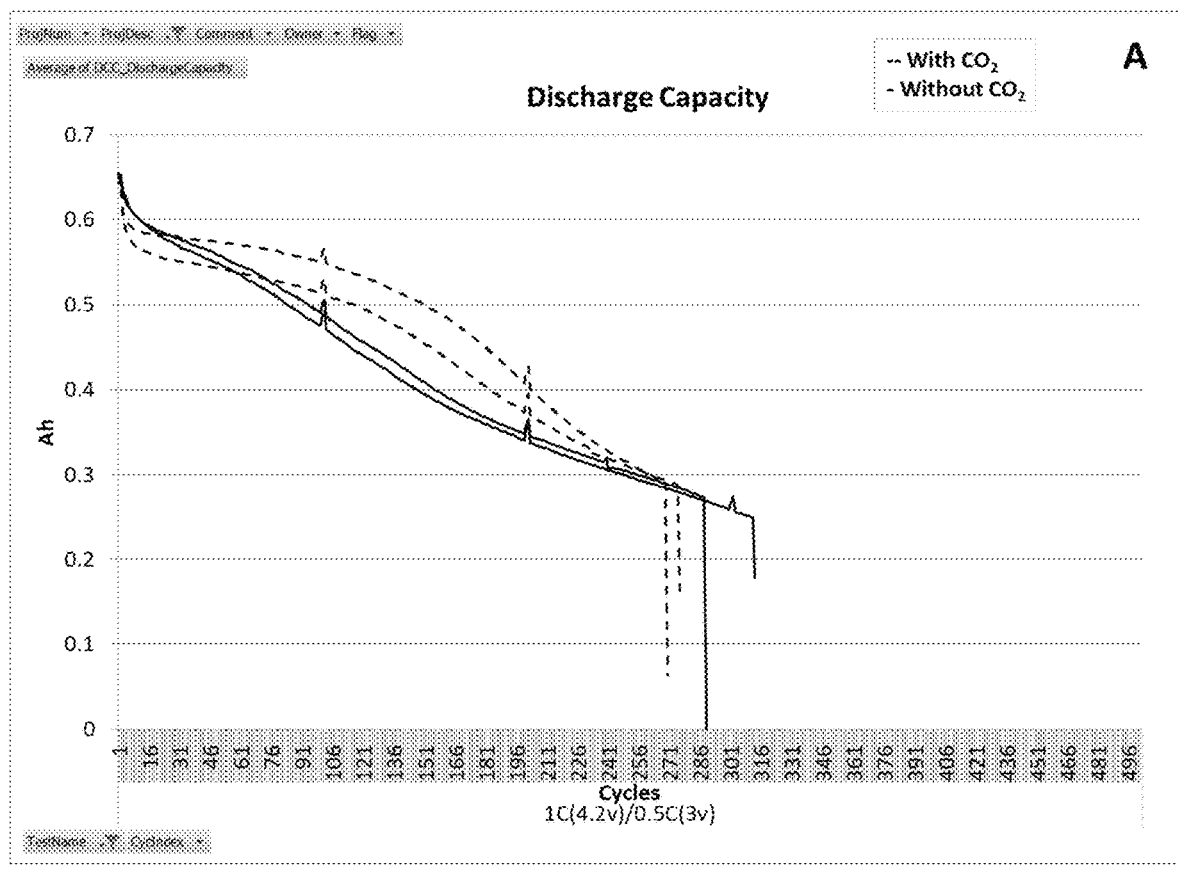
FIG. 2A shows the discharge capacity retention as a function of cycles of cells with and without $CO_2$ added.
Figure 2B:
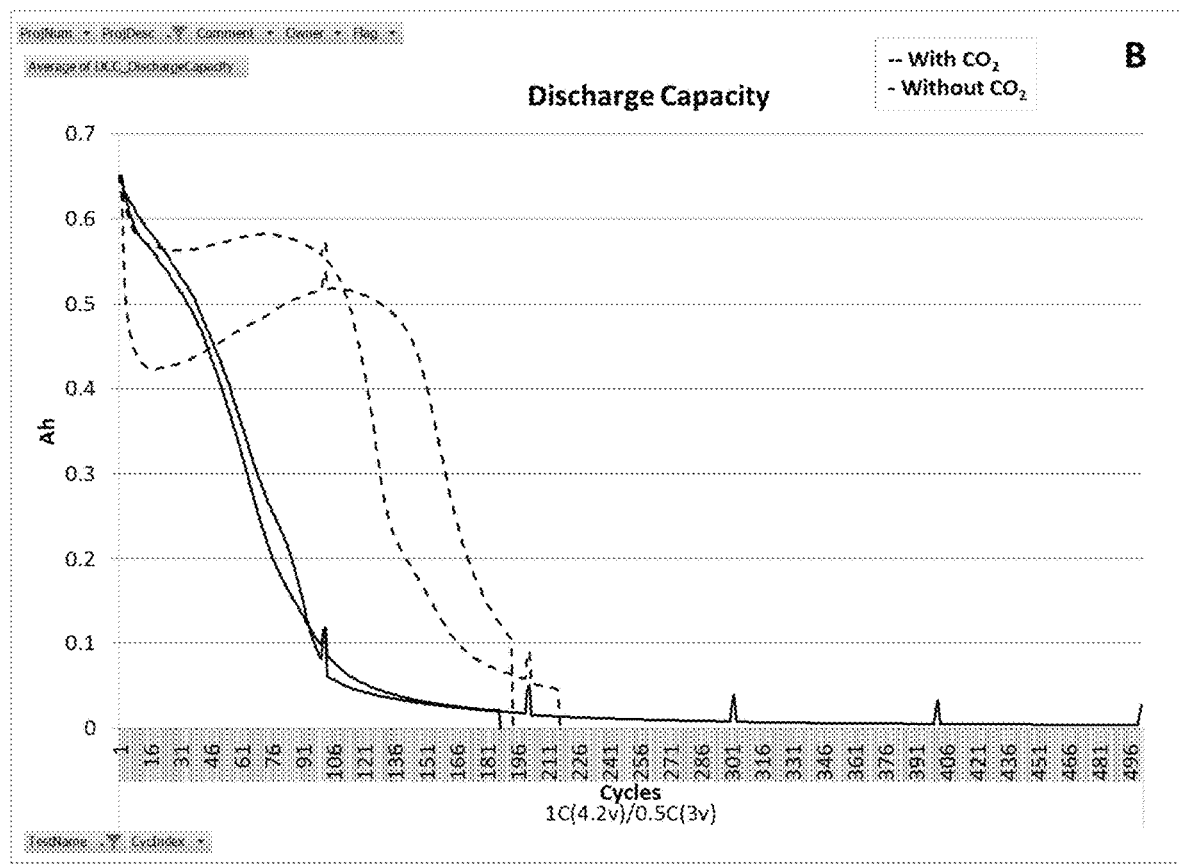
FIG. 2B shows the discharge capacity retention as a function of cycles of cells with and without $CO_2$ added.
Figure 2C:
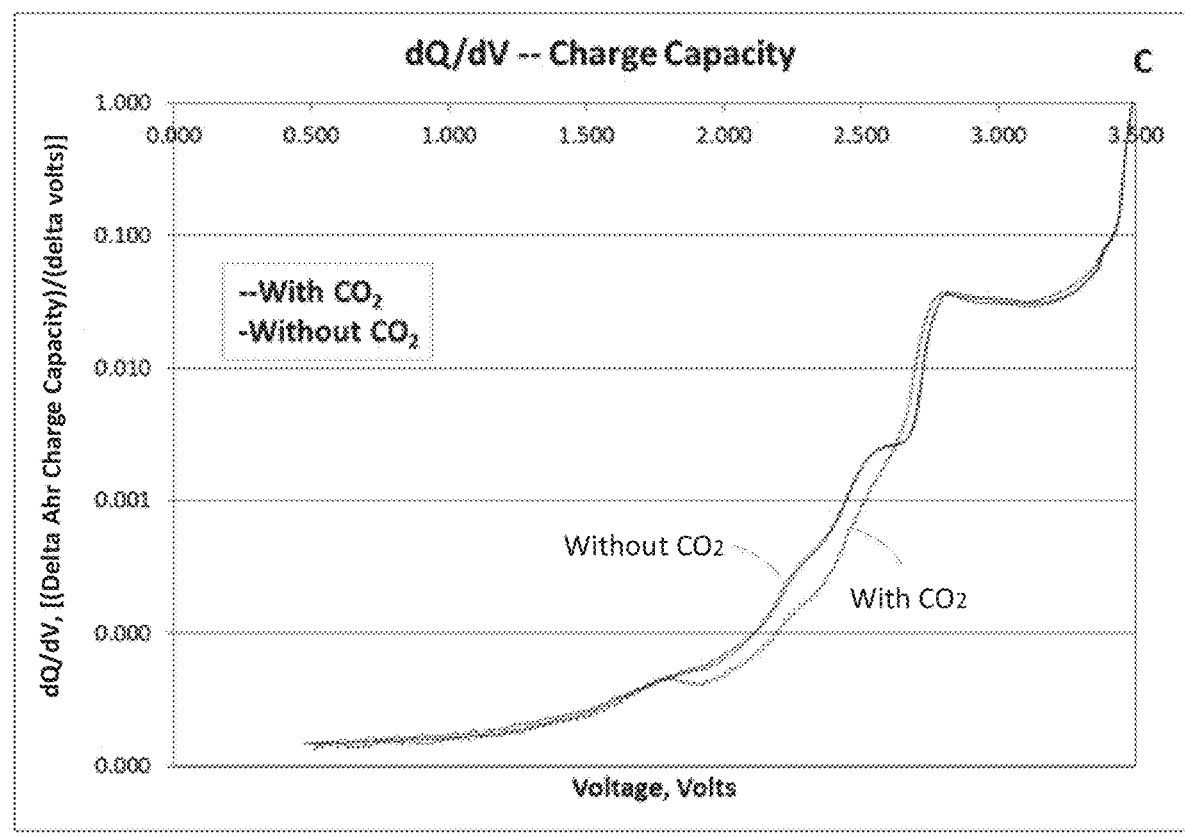
FIG. 2C shows the dQ/dV during the first formation charge as a function of voltage of cells with and without $CO_2$ added.
Figure 2D:
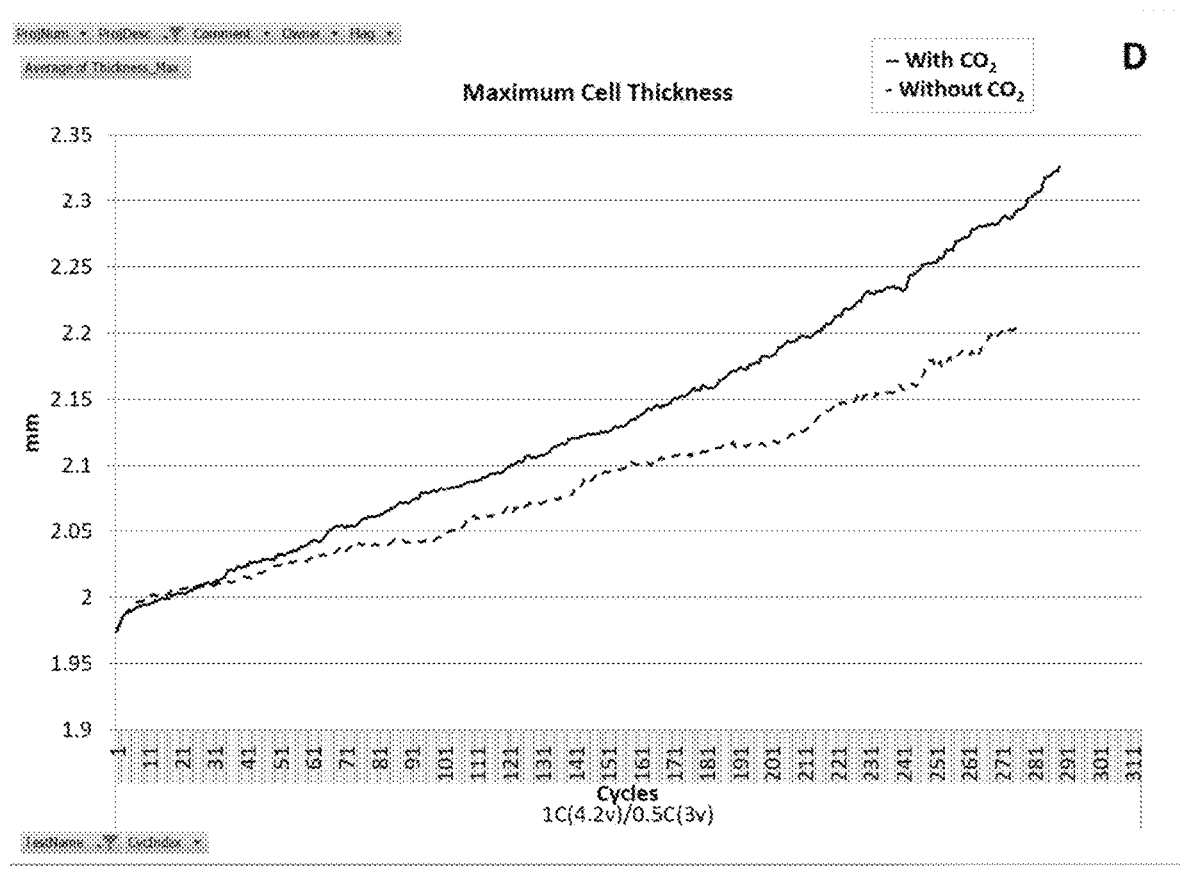
FIG. 2D shows the cell thickness as a function of cycles of cells with and without $CO_2$ added.

FIG. 2A shows the discharge capacity retention as a function of cycles of the cells with 1.2M $LiPF_6$ in FEC/PC/EMC (2/1/7 wt %); FIG. 2B shows the discharge capacity retention as a function of cycles of the cells with 1.2M $LiPF_6$ in EC/EMC (3/7 wt %); FIG. 2C shows the charge capacity (dQ/dV—During Charge) of the cells as a function of voltage; and FIG. 2D shows the cell thickness during cycle life. The solid lines are the results of the control cells without $CO_2$ and the broken lines are the results of the cells with $CO_2$ added. The discharge capacity curves in FIGS. 2A-2B show that the cycle life is improved when $CO_2$ is added to the cells.

The dQ/dV data for both control and $CO_2$ additive-containing cells were obtained through the following testing protocol: Rest 5 minutes, charge at 0.025 C to 25% nominal capacity, charge at 0.2 C to 4.2 V until 0.05 C, rest 5 minutes, discharge at 0.2 C to 3.0 V, rest 5 minutes. The 1st formation cycle dQ/dV curves in FIG. 2C show that $CO_2$ additive-containing cells show a strong peak between 1.5-2.0V which indicates that the SEI layer is changed and may passivate further reaction of electrolytes at higher voltages. The cell thickness increase for cells with $CO_2$ is reduced compared to the control cells, as shown in FIG. 2D.

Example 2

Cells were built with NCM cathodes and silicon-containing anodes. Cells were filled with 1.2M $LiPF_6$ in FEC/EMC (3/7 wt %). The cells were hot/cold pressed to activate the polymer adhesive on the separator in order to maintain adhesion between the anode, cathode, and separator layers, even when the cell expanded from adding $CO_2$. $CO_2$ was added in the form of dry ice, directly to the cell stack. Cells were clamped with metal plates and bolts to simulate the pressure applied in an Electric Vehicle (EV) battery pack housing, then tested.

The Si-dominant anodes contained about 80 wt % Si, 5 wt % graphite and 15 wt % glassy carbon (which could be derived from resin) and were laminated on 15 μm Cu foil. The average loading was about 3.8 mg/cm$^2$. The cathodes contained about 92 wt % NCM-622, 4 wt % Super P and 4 wt % PVDF and were coated on 15 μm Al foil. The average loading was about 23 mg/cm$^2$. Cells were clamped with stainless steel clamps with a fixed gap of the measured initial cell thickness and were held together with 4 bolts.

Figure 3:
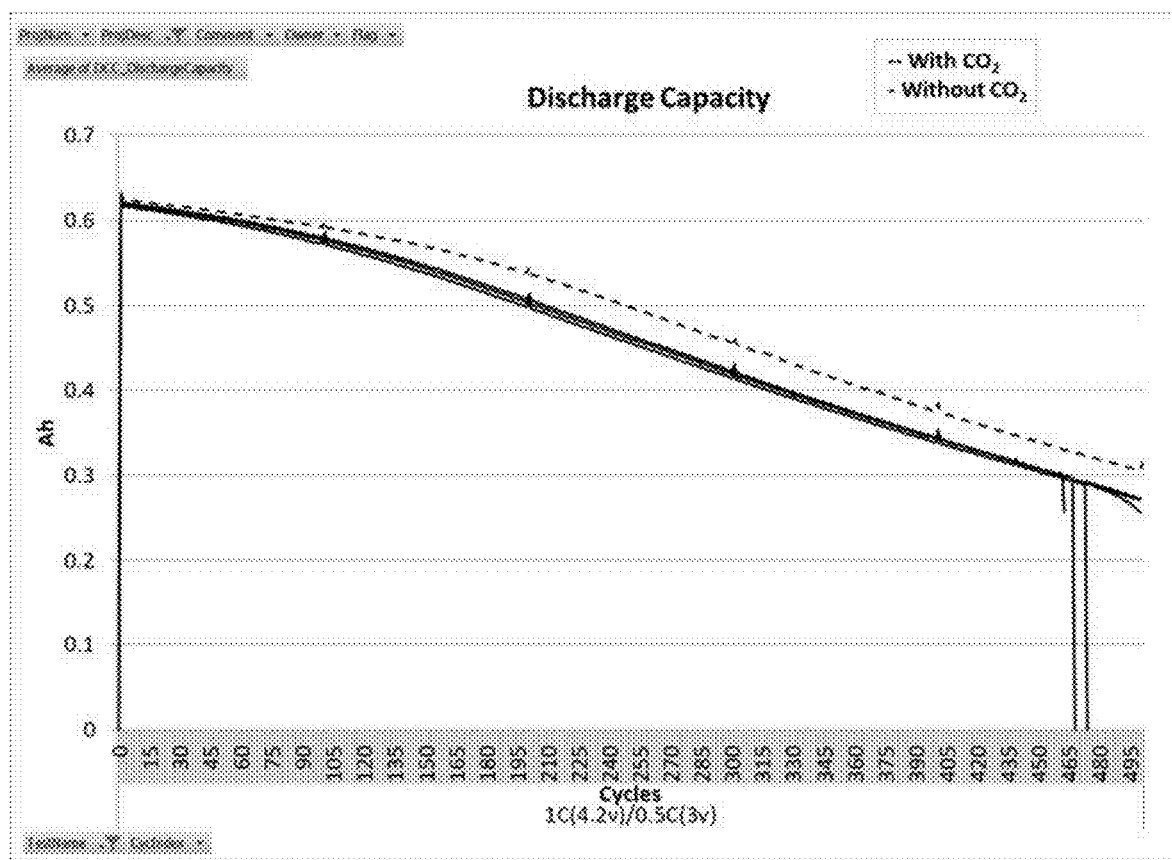
FIG. 3 shows the discharge capacity retention as a function of cycles of cells with and without $CO_2$ added.

FIG. 3 shows the discharge capacity retention of cells with and without $CO_2$ where solid lines are the results of the control cells without $CO_2$ and the broken lines are the results of the cells with $CO_2$ added. The discharge capacity curves shown in FIG. 3 show that the cycle life is improved when $CO_2$ is added to the cells.

Example 3

Cells were built with silicon-containing anodes and either NCM or NCA cathodes. Cells were filled with 1.2M $LiPF_6$ in FEC/EMC (3/7 wt %). The cells were hot/cold pressed to activate the polymer adhesive on the separator in order to maintain adhesion between the anode, cathode, and separator layers, even when the cell expanded from adding $CO_2$. $CO_2$ was added in the form of dry ice, directly to the cell stack. Cells were clamped with acrylic plates and binder clips to simulate applied pressure in an EV battery pack housing, then tested.

The Si-dominant anodes contained about 80 wt % Si, 5 wt % graphite and 15 wt % glassy carbon (which could be derived from resin), and were laminated on 15 μm Cu foil. The average loading was about 3.8 mg/cm². The cathodes contained about 92 wt % NCM-622 or NCA, 4 wt % Super P and 4 wt % PVDF, and were coated on 15 μm Al foil. The average loading was about 23 mg/cm². Cells were clamped with acrylic clamps held together with large binder clips.

Figure 4A:
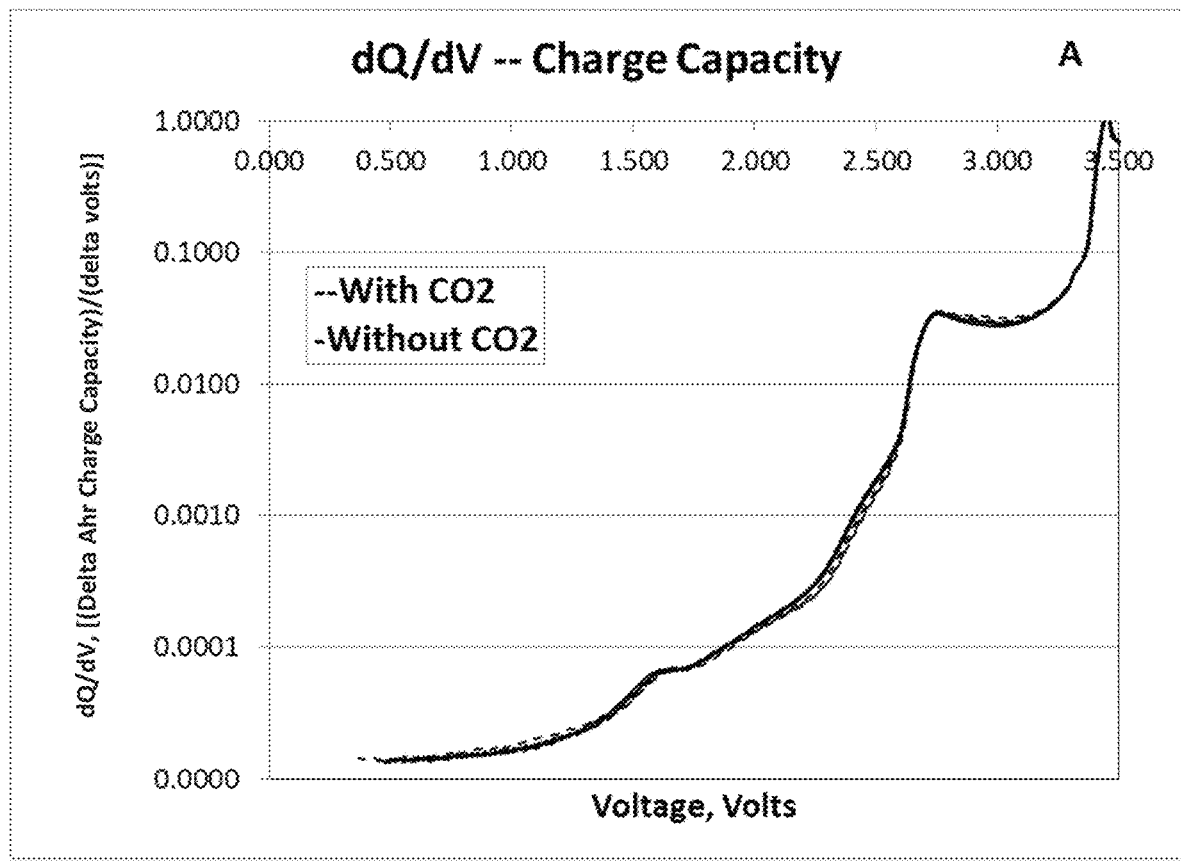
FIG. 4A shows the dQ/dV during the first formation charge as a function of voltage of cells with and without $CO_2$ added.
Figure 4B:
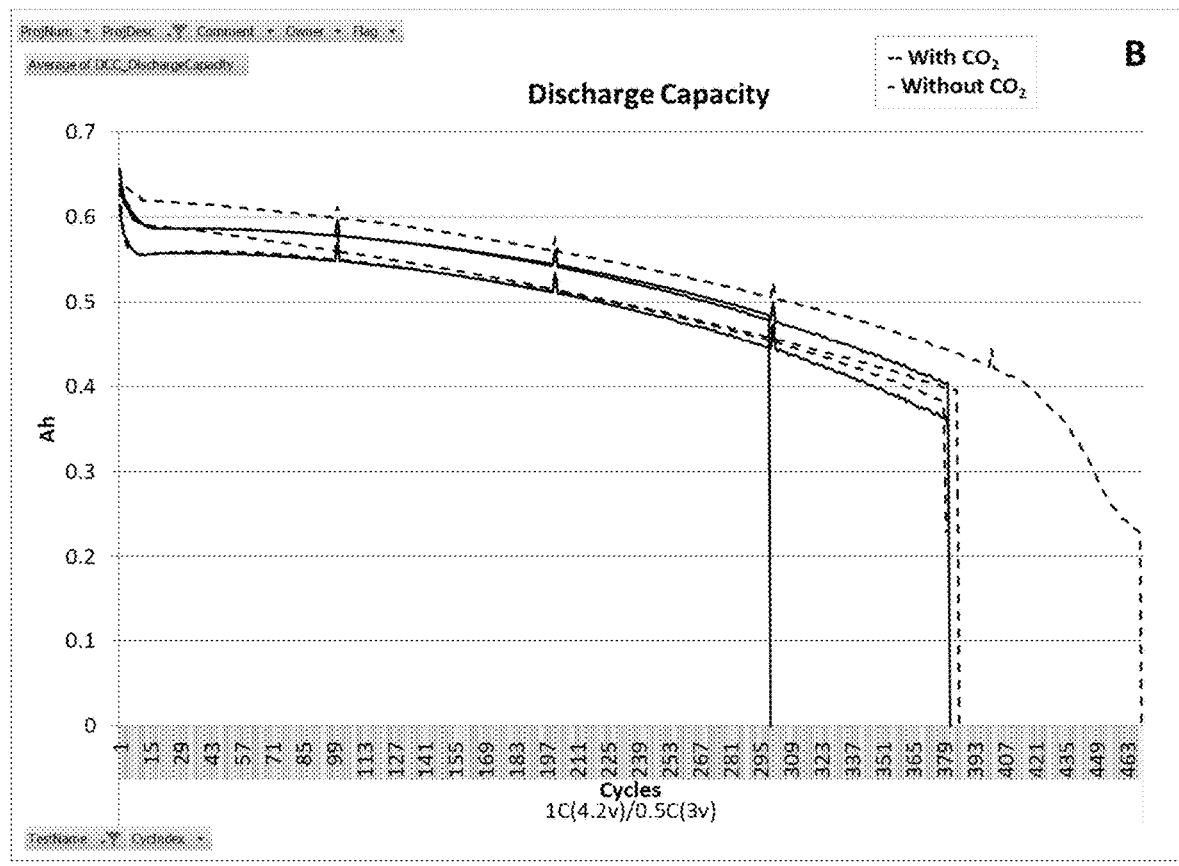
FIG. 4B shows the discharge capacity retention as a function of cycles of cells with and without $CO_2$ added.
Figure 4C:
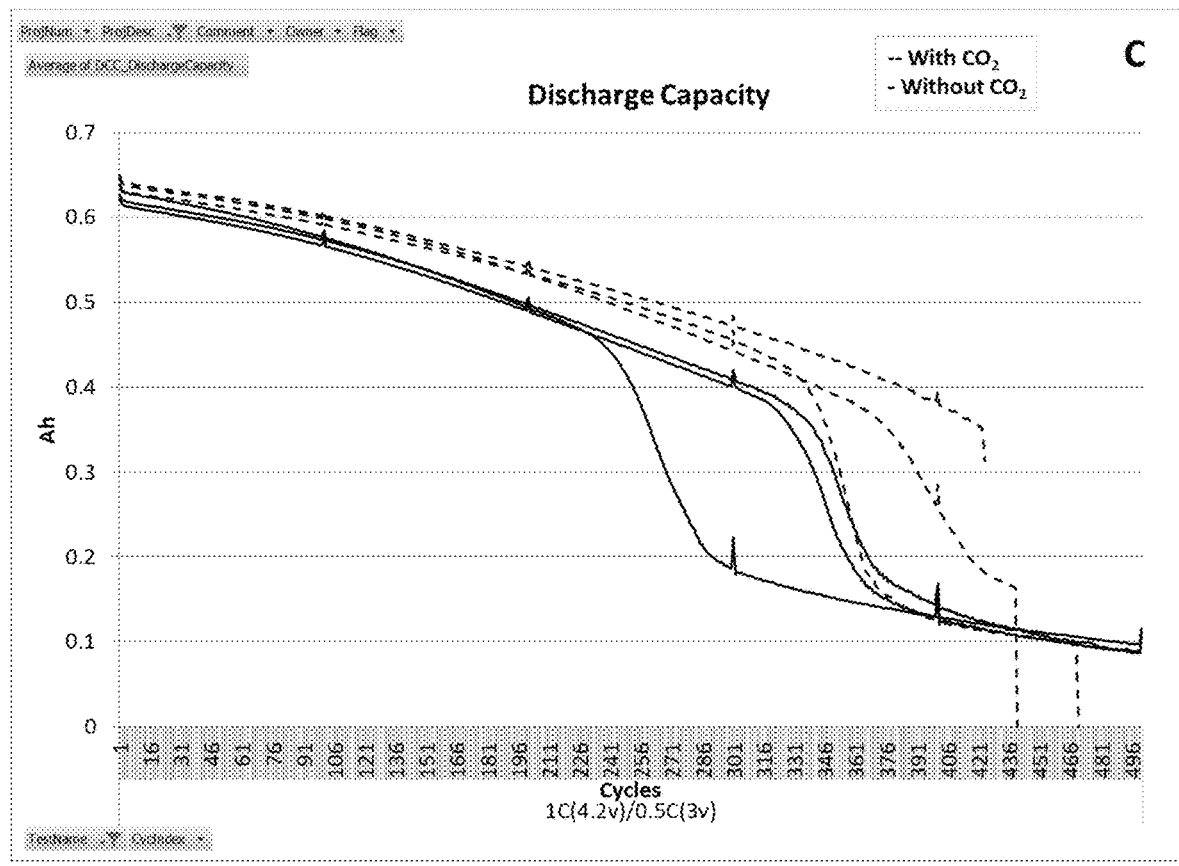
FIG. 4C shows the discharge capacity retention as a function of cycles of cells with and without $CO_2$ added.

FIG. 4A shows the charge capacity (dQ/dV) as a function of voltage of the cells with NCA cathodes; FIG. 4B shows the discharge capacity retention as a function of cycles of the cells with the NCA cathodes; FIG. 4C shows the discharge capacity retention as a function of cycles of the cells with the NCM cathodes, where solid lines are the results of the control cells without $CO_2$ and the broken lines are the results of the cells with $CO_2$ added.

The dQ/dV data for both control and $CO_2$ additive-containing cells were obtained through the following testing protocol: Rest 5 minutes, charge at 0.025 C to 25% nominal capacity, charge at 0.2 C to 4.2 V until 0.05 C, rest 5 minutes, discharge at 0.2 C to 3.0 V, rest 5 minutes. The 1st formation cycle dQ/dV curves in FIG. 4A indicate that there is substantially no change to the anode SEI formation when NCA is used. The peak seen in FIG. 2C when $CO_2$ is introduced already exists with NCA even when no $CO_2$ is introduced. Thus, there is little to no change to the dQ/dV when additional $CO_2$ is added to a cell with NCA as the cathode. Without being bound by theory, $CO_2$ is produced from $Li_2CO_3$ on the NCA surface, e.g., via the reaction: $2HF+Li_2CO_3=2LiF+H_2O+CO_2$. Although some implementations can use NCA as a cathode, various embodiments can use other materials (e.g., with $CO_2$) in place of NCA, such as other materials which may be safer, less expensive, and/or more readily available than NCA.

Gas may negatively affect the cell performance including potentially causing high cell impedance. Certain embodiments described herein can generate $CO_2$ at a similar rate (or greater) of consumption (e.g. cells tend to gas at a fast rate) and achieve good cycle life. In addition, it can be challenging to handle the gas, yet various implementations described herein can hold the cell layers together such that the gas does not degrade the cell.

Various embodiments have been described above. Although the invention has been described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. An electrochemical cell comprising:
   a first electrode, a second electrode, a separator between the first and second electrodes, and an electrolyte in a cell container, wherein the first electrode comprises silicon-dominant electrochemically active material, wherein the silicon-dominant electrochemically active material comprises greater than 50% silicon by weight; and
   a solid electrolyte interphase (SEI) layer on the first electrode formed from exposing at least a part of the electrochemical cell to $CO_2$;
   wherein the first electrode, the second electrode, and the separator are held together with a polymer adhesive on the separator in order to maintain adhesion between the first electrode, second electrode, and separator while the at least a part of the electrochemical cell is exposed to $CO_2$;
   wherein the second electrode comprises nickel cobalt aluminum (NCA); and
   wherein the $CO_2$ is produced from $Li_2CO_3$ on the surface of the NCA.

2. The electrochemical cell of claim 1, wherein the SEI layer is about 1 nm to about 20 nm thick.

3. The electrochemical cell of claim 1, wherein forming the SEI layer occurs during lithiation.

4. The electrochemical cell of claim 1, wherein the silicon-dominant electrochemically active material comprises silicon at about 60% to about 100% by weight.

5. The electrochemical cell of claim 4, wherein the silicon-dominant electrochemically active material comprises silicon at about 70% to about 100% by weight.

6. The electrochemical cell of claim 1, wherein the $CO_2$ is provided in the cell container.

7. The electrochemical cell of claim 6, wherein the $CO_2$ is provided in an amount of about 0.01 to about 0.6 mg per mg of the silicon.

8. The electrochemical cell of claim 1, wherein the electrolyte comprises greater than about 10% to about 90% carbonate solvent by weight.

9. The electrochemical cell of claim 1, wherein the electrolyte comprises a cyclic carbonate solvent.

10. The electrochemical cell of claim 9, wherein the solvent comprises fluoroethylene carbonate (FEC), difluoroethylene carbonate (F2EC), trifluoroethylene carbonate (F3EC), ethylene carbonate (EC), propylene carbonate (PC), or trifluoropropylene carbonate (TFPC), or a mixture thereof.

11. The electrochemical cell of claim 1, wherein the electrolyte comprises a linear carbonate solvent.

12. The electrochemical cell of claim 11, wherein the solvent comprises ethylmethyl carbonate (EMC), diethyl carbonate (DEC), dimethyl carbonate (DMC), methyl 2,2,2-trifluoroethyl carbonate (TFEMC), ethyl 2,2,2-trifluoroethyl carbonate (TFDEC), or difluoromethyl fluoromethyl carbonate (TFDMC), or a mixture thereof.

13. The electrochemical cell of claim 1, wherein the separator comprises polyolefin, cellulose, or a combination thereof.

14. The electrochemical cell of claim 1, wherein the adhesive comprises poly(vinylidene fluoride)/poly(methyl methacrylate) (PVDF/PMMA).

15. The electrochemical cell of claim 1, wherein the first electrode is a self-supported film.

16. The electrochemical cell of claim 1, wherein the first electrode comprises a Si-composite electrochemically active film.

17. An electrochemical cell comprising:
   a first electrode, a second electrode, a separator between the first and second electrodes, and an electrolyte in a cell container, wherein the first electrode comprises silicon-dominant electrochemically active material, wherein the silicon-dominant electrochemically active material comprises greater than 50% silicon by weight; and a solid electrolyte interphase (SEI) layer on the first electrode formed from exposing at least a part of the electrochemical cell to $CO_2$;

wherein the first electrode, the second electrode, and the separator are held together with a polymer adhesive on the separator in order to maintain adhesion between the first electrode, second electrode, and separator while the at least a part of the electrochemical cell is exposed to $CO_2$;

wherein the second electrode comprises nickel cobalt aluminum (NCA); and wherein the SEI layer comprises solid carbonate on LiF particles.

18. The electrochemical cell of claim 17, wherein the SEI layer is about 1 nm to about 20 nm thick.

19. The electrochemical cell of claim 17, wherein forming the SEI layer occurs during lithiation.

20. The electrochemical cell of claim 17, wherein the silicon-dominant electrochemically active material comprises silicon at about 60% to about 100% by weight.

21. The electrochemical cell of claim 20, wherein the silicon-dominant electrochemically active material comprises silicon at about 70% to about 100% by weight.

22. The electrochemical cell of claim 17, wherein the $CO_2$ is provided in the cell container.

23. The electrochemical cell of claim 22, wherein the $CO_2$ is provided in an amount of about 0.01 to about 0.6 mg per mg of the silicon.

24. The electrochemical cell of claim 17, wherein the $CO_2$ is provided by adding dry ice to the electrolyte.

25. The electrochemical cell of claim 24, wherein the $CO_2$ is provided in an amount of about 0.01 to about 0.6 mg per mg of the silicon.

26. The electrochemical cell of claim 17, wherein the $CO_2$ is dissolved in the electrolyte.

27. The electrochemical cell of claim 26, wherein the $CO_2$ is dissolved in an amount of about 0.01 to about 0.6 mg per mg of the silicon.

28. The electrochemical cell of claim 17, wherein the electrolyte comprises greater than about 10% to about 90% carbonate solvent by weight.

29. The electrochemical cell of claim 17, wherein the electrolyte comprises a cyclic carbonate solvent.

30. The electrochemical cell of claim 29, wherein the solvent comprises fluoroethylene carbonate (FEC), difluoroethylene carbonate (F2EC), trifluoroethylene carbonate (F3EC), ethylene carbonate (EC), propylene carbonate (PC), or trifluoropropylene carbonate (TFPC), or a mixture thereof.

31. The electrochemical cell of claim 17, wherein the electrolyte comprises a linear carbonate solvent.

32. The electrochemical cell of claim 31, wherein the solvent comprises ethylmethyl carbonate (EMC), diethyl carbonate (DEC), dimethyl carbonate (DMC), methyl 2,2,2-trifluoroethyl carbonate (TFEMC), ethyl 2,2,2-trifluoroethyl carbonate (TFDEC), or difluoromethyl fluoromethyl carbonate (TFDMC), or a mixture thereof.

33. The electrochemical cell of claim 17, wherein the separator comprises polyolefin, cellulose, or a combination thereof.

34. The electrochemical cell of claim 17, wherein the adhesive comprises poly(vinylidene fluoride)/poly(methyl methacrylate) (PVDF/PMMA).

35. The electrochemical cell of claim 17, wherein the first electrode is a self-supported film.

36. The electrochemical cell of claim 17, wherein the first electrode comprises a Si-composite electrochemically active film.

* * * * *